United States Patent [19]
Fujii et al.

[11] Patent Number: 6,020,919
[45] Date of Patent: Feb. 1, 2000

[54] IMAGE INSPECTION SYSTEM FOR INSPECTING QUALITY ELEMENTS OF A DISPLAY SCREEN

[75] Inventors: Masaru Fujii, Kanagawa; Satoshi Takemoto, Tokyo; Tokio Takeuchi, Chiba, all of Japan

[73] Assignee: Sony Corporation, Tokyo, Japan

[21] Appl. No.: 08/856,144

[22] Filed: May 14, 1997

[30] Foreign Application Priority Data

May 23, 1996 [JP] Japan .................................... 8-128585

[51] Int. Cl.⁷ .................................................. H04N 17/04
[52] U.S. Cl. ............................................ 348/190; 348/189
[58] Field of Search ................................. ; 348/177, 178, 348/179, 189, 190, 191, 745, 746, 747, 806, 807, 180; 358/10, 139; H04N 17/04

[56] References Cited

FOREIGN PATENT DOCUMENTS

| | | | |
|---|---|---|---|
| 0404700 | 12/1990 | European Pat. Off. | ....... H04N 17/04 |
| 61-194993 | 8/1986 | Japan | ............................... H04N 17/04 |
| 2-150887 | 6/1990 | Japan | ............................... H04N 17/04 |
| 5-168054 | 7/1993 | Japan | ............................... H04N 17/04 |

*Primary Examiner*—David E. Harvey
*Attorney, Agent, or Firm*—Frommer Lawrence & Haug, LLP.; William S. Frommer

[57] ABSTRACT

An image inspection system for inspecting a display screen establishes a plurality of measurement spots on a display screen to be inspected, and measures images at the measurement spots and displays measured results on a monitor display screen. The image inspection system establishes display spots corresponding to the measurement spots on the monitor display screen, changes the positions of the display spots in a highlighted manner depending on the differences between measured values of the measurement spots and preset reference values, and displays measured results by inter-connecting the changed positions of the display spots with line segments.

6 Claims, 5 Drawing Sheets

Peripheral Inner Frame
Peripheral Outer Frame

B1~B9 Reference Circles
b1~b9 Dots of Measured Result

Measurement Number
Reference Data 1a
x=***
y=***
z=***

2a
x=***
y=***
z=***

3a
x=***
y=***
z=***

4a
x=***
y=***
z=***

5a
x=***
y=***
z=***

6a
x=***
y=***
z=***

IMAGE INSPECTION SYSTEM FOR INSPECTING QUALITY ELEMENTS OF A DISPLAY SCREEN

BACKGROUND OF THE INVENTION

1. Field of the Invention

The present invention relates to an image inspection system for effecting a quality control process on color display units including color television sets, color cathode-ray tubes, display monitor units, projection-type display units, etc.

2. Description of the Prior Art

For the quality control of color display units, it is necessary to inspect displayed images on those color display units for geometric raster distortions, color purity, convergence, focus, etc. on the display screens of the color display units. One conventional image inspection apparatus for inspecting such displayed images uses a video camera to image an arbitrary test chart displayed on a display screen to be inspected and processes an image signal generated by the video camera to inspect the display screen.

In the conventional image inspection apparatus, inspected (measured) results are displayed as shown in FIG. 1 of the accompanying drawings. As shown in FIG. 1, an area A surrounded by a peripheral outer frame and a peripheral inner frame is displayed on the inspected display screen, and contains dots "a" representative of measured results of outermost measurement spots. Nine reference circles B1~B9 are displayed in a central area on the display screen which is surrounded by the area A, and contain respective dots b1~b9 representative of measured results of measurement spots in the central area.

If the dots "a" are linearly displayed centrally in the area A, then it can be determined that the peripheral area of the screen is of good quality. If the dots b1~b9 are displayed at the respective centers of the reference circles B1~B9, then it can be determined that the central area of the screen is of good quality.

When human vision is relied upon to determine whether the dots "a" are linearly displayed centrally in the area A and also whether the dots b1~b9 are displayed at the respective centers of the reference circles B1~B9, decisions may suffer individual differences introduced by the operators. Stated otherwise, the array of dots "a", for example, is relatively unclear to the human eye for making a decision as to whether it is straight or not.

If the dots "a" are displaced out of the area A or the dots b1~b9 are displayed out of the respective reference circles B1~B9, then the display screen is judged as being defective. In a quality control process associated with a manufacturing process, it is general practice to establish two decision standards, i.e., adjustment standards and inspection standards, which are different from each other and used to make respective quality decisions. It is tedious and time-consuming and tends to be misleading the operator to display both the area A and the reference circles B1~B9 simultaneously for each of the adjustment standards and the inspection standards.

For establishing the decision standards, the dots "a", "b" are marked with measurement numbers, and reference values are entered at those numbered dots "a", "b" on a standard setting table as shown in FIG. 2 of the accompanying drawings. However, the process of entering the standard data is not easy to carry out because the reference values have to be entered while paying attention to the positions and numbers of the dots.

If the number of measurement spots is increased in an attempt to improve the quality control, then it will become difficult to decide how those measurement spots are associated with the numbers of the dots and it will need more manual work to enter reference values at the dots. Furthermore, the increased number of measurement spots is apt to make the displayed dots more unclear to the human eye. If an increased number of reference circles are displayed, they will look too crowded in the limited space on the display screen and be susceptible to observational errors.

It has also been proposed to display measured results as graphic patterns which have modeled an enlarged image of measurement spots, meter-like graphic patterns, or web-shaped graphic patterns. However, any of these proposed graphic patterns have failed to clearly display the measured results and to allow the operator to make decisions with ease.

SUMMARY OF THE INVENTION

It is therefore an object of the present invention to provide an image inspection system which is capable of displaying measured results clearly to allow the operator to make decisions with ease and also of allowing the operator to enter reference values easily.

According to the present invention, there is provided an image inspection system for inspecting a display screen, comprising means for establishing a plurality of measurement spots on a display screen to be inspected, a monitor display screen, means for measuring images at the measurement spots and displaying measured results on the monitor display screen, and inspection processing means for establishing display spots corresponding to the measurement spots on the monitor display screen, changing the positions of the display spots in a highlighted manner depending on the differences between measured values of the measurement spots and preset reference values, and displaying measured results by interconnecting the changed positions of the display spots with line segments.

The inspection processing means may comprise means for displaying the line segments in a different color when the differences fall out of a predetermined tolerance range. The tolerance range comprises a plurality of zones, the inspection processing means comprises means for displaying the line segments in different colors when the differences fall in the zones, respectively.

The image inspection system may further comprise means for establishing the preset reference values by displaying display spots corresponding to the measurement spots on the monitor display screen, selecting one of the display spots at a time, and entering reference values into the one of the display spots.

The inspection processing means may comprise means for displaying a frame indicative of a tolerance range with respect to the display spots on the monitor display screen.

The images may be measured at the measurement spots with respect to geometric raster distortions, color purity, convergence, or focus.

DETAILED DESCRIPTION OF THE PREFERRED EMBODIMENTS

Figure 3:
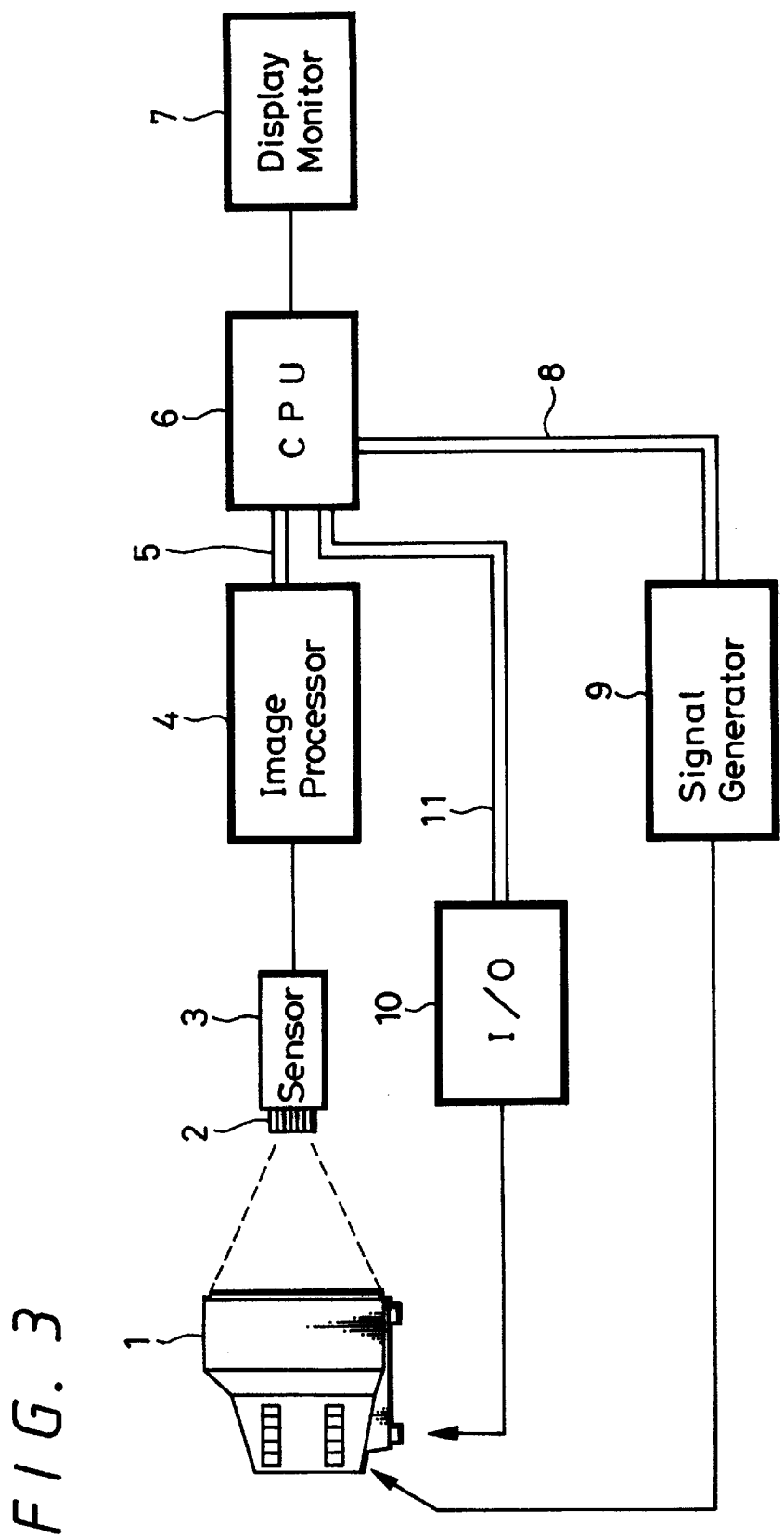
FIG. 3 is a block diagram of an image inspection system according to the present invention.

As shown in FIG. 3, an image inspection system according to the present invention is typically used to inspect the display screen of a color display unit 1 such as a color television set, a color cathode-ray tube, a display monitor unit, a projection-type display unit, or the like. The image inspection system displays an arbitrary test chart on the display screen of the color display unit 1 for making desired measurements.

The image inspection system includes a video camera 3 as a sensor which has a fixed-focus lens 2 facing the color display unit 1. The displayed image of the test chart on the display screen of the color display unit 1 is captured by the video camera 3 through the fixed-focus lens 2. The video camera 3 produces an image signal representative of the image of the test chart and supplies the image signal to an image processor 4.

The image processor 4 has an A/D (analog-to-digital) converter and a frame memory. The A/D converter converts the analog image signal from the video camera 3 to digital image information, which is stored in the frame memory. If the video camera 3 can generate a digital image signal, then the A/D converter in the image processor 4 may be dispensed with.

The image information stored in the frame memory is then transferred through a bus line 5 to a memory connected to a CPU (central processing unit) 6. The CPU 6 processes the transferred image information to measure geometric raster distortions (image distortions), color purity, convergence, focus, etc. which are image quality elements of the display screen of the color display unit 1. The measured results are then displayed as numerical values or a graphic pattern on the display screen of a display monitor 7.

Figure 4:
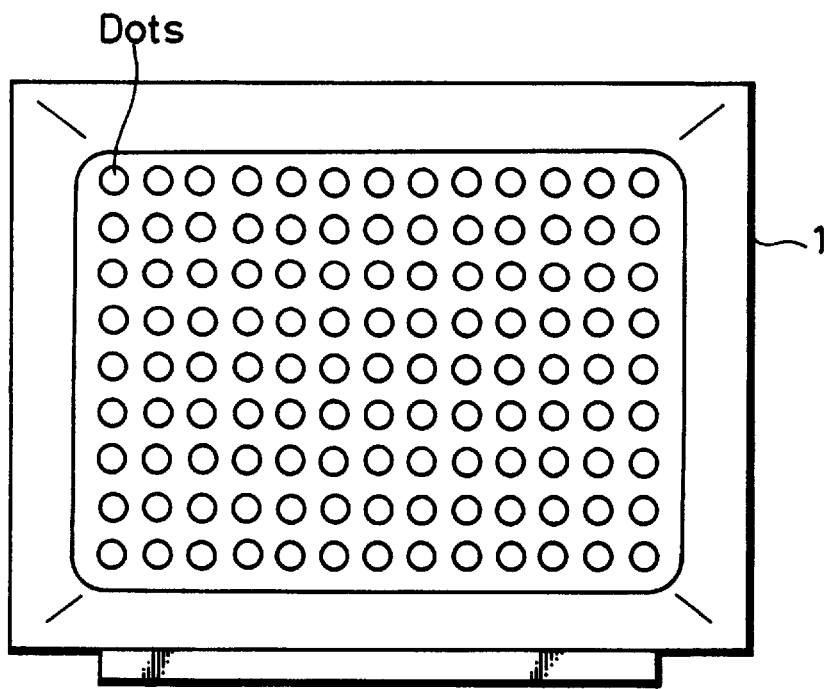
FIG. 4 is a front elevational view of a display screen to be inspected by the image inspection system, showing an example of dots displayed on the display screen for inspecting the display screen.

If image distortions, for example, are to be measured, then a test chart of dots corresponding to measurement spots as shown in FIG. 4 is displayed on the display screen of the color display unit 1. The dots are shown exaggerated in FIG. 4 and are actually smaller than the illustrated size. Image information representative of the displayed test chart is supplied to the CPU 6, which compares the positions of the dots represented by the image information with preset reference values (described later on) to produced differences therebetween as measured results.

The measured results are then displayed as numerical values or a graphic pattern on the display screen of the display monitor 7. The data of the measured results may be stored in a storage medium such as a hard disk or the like associated with the CPU 6, or transmitted through a communication network to a host computer or the like for a statistic analysis or the like.

The CPU 6 controls a signal generator 9 through a bus line 8 to generate a pattern signal of the test pattern. The generated pattern signal is supplied to the color display unit 1, which displays the test pattern on its display screen.

An I/O (input/output) circuit 10 is connected through a bus line 11 to the CPU 6. If the image inspection system is used with respect to a display unit production line, then the CPU 6 sends a measurement start or end signal through the I/O circuit 10 to the color display unit 1 and also sends a serial signal through the I/O circuit 10 to the color display unit 1 for automatically adjusting the color display unit 1.

Figure 5:
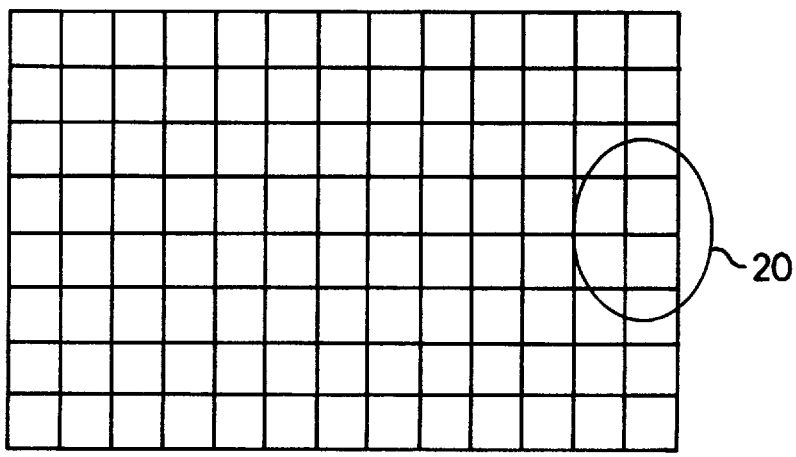
FIG. 5 is a view showing an example of measured results that are displayed.

The CPU 6 displays a graphic pattern shown in FIG. 5 on the display screen of the display monitor 7. The graphic pattern shown in FIG. 5 corresponds to the test chart shown in FIG. 4. The graphic pattern comprises a matrix of display spots corresponding to the differences between the displayed positions of the dots of the test chart and the preset reference values, and line segments interconnecting the display spots.

Figure 6:
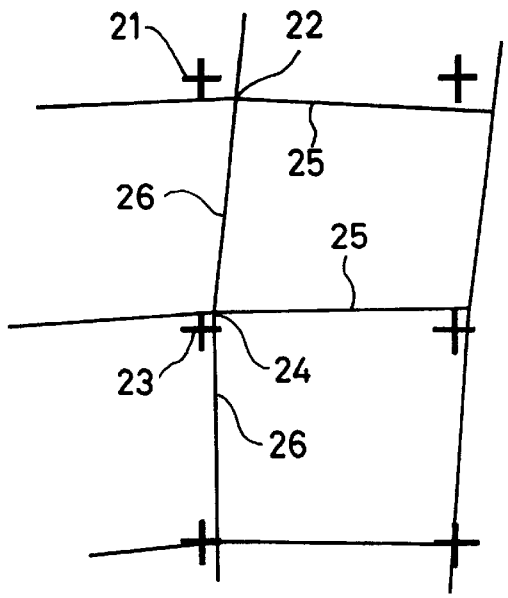
FIG. 6 is an enlarged fragmentary view of the measured results shown in FIG. 5.

FIG. 6 shows an enclosed area 20 of the graphic pattern shown in FIG. 5 at an enlarged scale. In FIG. 6, the display spots are horizontally and vertically shifted from respective reference positions "+" which represent the preset reference values. For example, the display spot 22 which is associated with the upper left reference position 21 is shifted downwardly to the right of the reference position 21, and the display spot 24 which is associated with the central left reference position 23 is shifted upwardly to the right of the reference position 23. These display spots which are shifted from the associated reference positions are displayed in a highlighted fashion.

In the displayed graphic pattern, the display spots including the display spots 22, 24 are interconnected by horizontal and vertical line segments 25, 26 to clearly indicate shifts or displacements of the display spots. Specifically, positional shifts or displacements of the display spots are displayed as distortions of the line segments and hence can clearly be recognized thereby.

Consequently, even if the number of measurement spots corresponding to the dots of the displayed test chart is large, e.g., 100 or more, positional shifts or displacements of the display spots are clearly displayed. The increased number of measurement spots allows the display screen to be inspected in detail for making an accurate decision.

A certain tolerance range is established with respect to each of the reference values. When the measured value of each of the dots, i.e., the display spots, falls out of the tolerance range, the graphic pattern is generated such that line segments associated with the display spot are displayed in a different color. For example, when a display spot is shifted horizontally out of the tolerance range, the horizontal line segments 25 associated therewith are displayed in a different color, and when a display spot is shifted vertically out of the tolerance range, the vertical line segments 26 associated therewith are displayed in a different color.

Different tolerance ranges may be established as the adjustment standards and inspection standards. When the measured value of a dot or a display spot falls within the adjustment standards, the line segments associated therewith may be displayed in green, for example. When the measured value of a dot or a display spot falls between the adjustment and inspection standards, the line segments associated therewith may be displayed in yellow, for example. When the measured value of a dot or a display spot falls outside of the inspection standards, the line segments associated therewith may be displayed in red, for example. The line segments thus displayed in different colors allow the measured results to be determined highly clearly.

Specifically, if all the line segments are displayed in green, the measured results are judged as acceptable. If line segments are displayed in yellow, then the color display unit 1 is adjusted so that the measured values of a display spot or spots connected to those line segments fall within the adjustment standards. If line segments are displayed in red, then the color display unit 1 with the inspected display screen is judged as defective, failing to meet the inspection standards. Accordingly, the measured results can be determined highly clearly.

With positional shifts or displacements of the display spots being thus displayed as colors of line segments, it is not necessary to display the reference positions "+" in the graphic pattern shown in FIG. 4. If the reference positions "+" are removed from the graphic pattern, then the resulting graphic pattern can be displayed at an increased speed on the display monitor 7. The variable colors of the line segments are not limited to the hues specified above, but may be such hues that are easily perceptible on the display screen of the display monitor 7 in its entirety.

The measurement of geometric raster distortions (image distortions) of the display screen of the color display unit 1 has been described above because they are easily understandable visually. However, the display monitor 7 can display similar graphic patterns for measuring color purity, convergence, focus, etc. For measuring color purity, convergence, focus, etc., display spots displayed on the display monitor 7 are shifted or displaced depending on the differences between measured values of color purity, convergence, focus, etc. and reference values therefor, and interconnected by line segments in different colors to allow measured results to be displayed clearly for accurate decisions.

As described above, the image inspection system establishes display spots corresponding respectively to measurement spots on a monitor display screen, changes the positions of the display spots depending on the differences between measured values of the measurement spots and preset reference values, and displays measured results by interconnecting the changed positions of the display spots with line segments. The measured results are thus displayed highly clearly to allow changes in the measured values to be determined accurately.

While the conventional apparatus has been disadvantageous in that the measured results are not displayed clearly and changes in the measured values cannot easily be determined, the image inspection system according to the present invention is capable of displaying the measured results highly clearly to allow changes in the measured values to be determined accurately.

The image inspection system according to the present invention displays the line segments interconnecting the display spots in colors depending on the adjustment and inspection standards. Consequently, the measured results are clearly displayed visually and hence can easily be determined accurately.

Figure 7A:
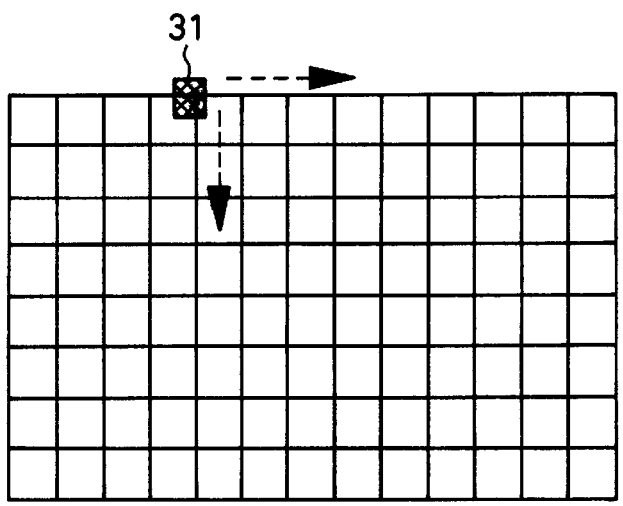
FIGS. 7A and 7B are views illustrative of the manner in which reference values are established.
Figure 7B:
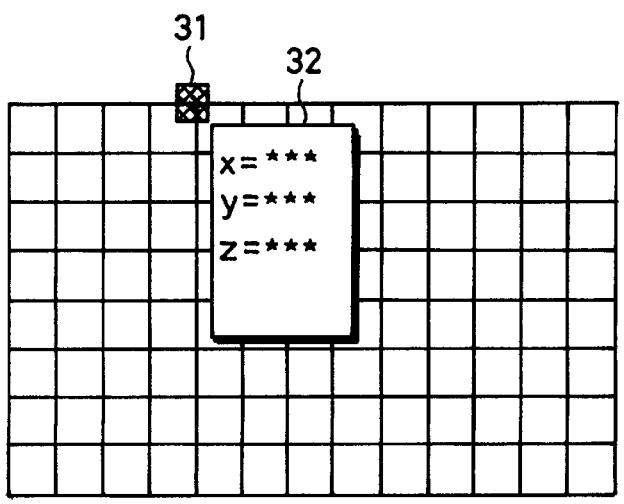

On the image inspection system, reference values of the adjustment and inspection standards are established in a manner as shown in FIGS. 7A and 7B, for example. For establishing reference values, a graphic pattern comprising a matrix of display spots corresponding to respective measurement spots and line segments interconnecting the display spots is displayed as shown in FIG. 7A. An arbitrary cursor 31 is displayed on one of the display spots of the graphic pattern.

The cursor 31 is movable vertically and horizontally from one display spot to an adjacent display spot in response to a key stroke on a keyboard, for example, connected to the CPU 6. When the cursor 31 is moved to an arbitrary display spot, a window 32, for example, is opened in the vicinity of the display spot, as shown in FIG. 7B. Setting items are displayed in the window 32, and numerical values are entered through the keyboard into the displayed setting items for thereby establishing reference values for that display spot.

Figures 1, 2:
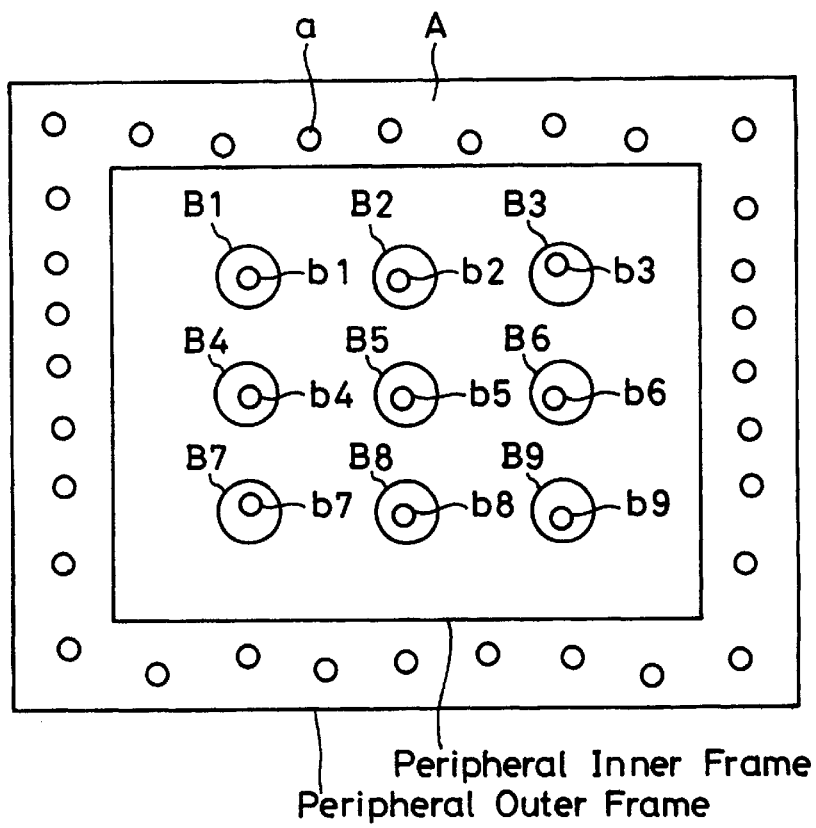
FIG. 1 is a diagram illustrating a conventional process of displaying measured results on a display screen that is inspected.
FIG. 2 is a diagram illustrating a conventional process of entering reference values at numbered dots.

Since reference values can be entered by the operator for any display spot pointed by the cursor 31, the operator finds it easy to establish the reference values accurately. The reference values can be entered easily also because the operator is not required to enter them while paying attention to the positions and numbers of dots on the table shown in FIG. 2.

As a consequence, the reference values of the adjustment and inspection standards can easily be established, and the image inspection system can easily be operated to establish those reference values. Even if reference values are to be established for 100 or more measurement spots, they can easily and quickly be established by the image inspection system.

The image inspection system may be arranged to display measured results for not all the measurement spots but mainly measurement spots in a peripheral area and along central axes of the display screen. Specifically, it is important for an evaluation of image quality that, as shown in FIG. 8, measurement spots in an outermost peripheral area 41 and along a vertical central axis (hereinafter referred to as a "Y-axis") 42 and a horizontal central axis (hereinafter referred to as an "X-axis") 43 of the display screen of the color display unit 1 be measured out of 117 measurement spots arranged in a matrix of 9 rows and 13 columns.

Figure 9:
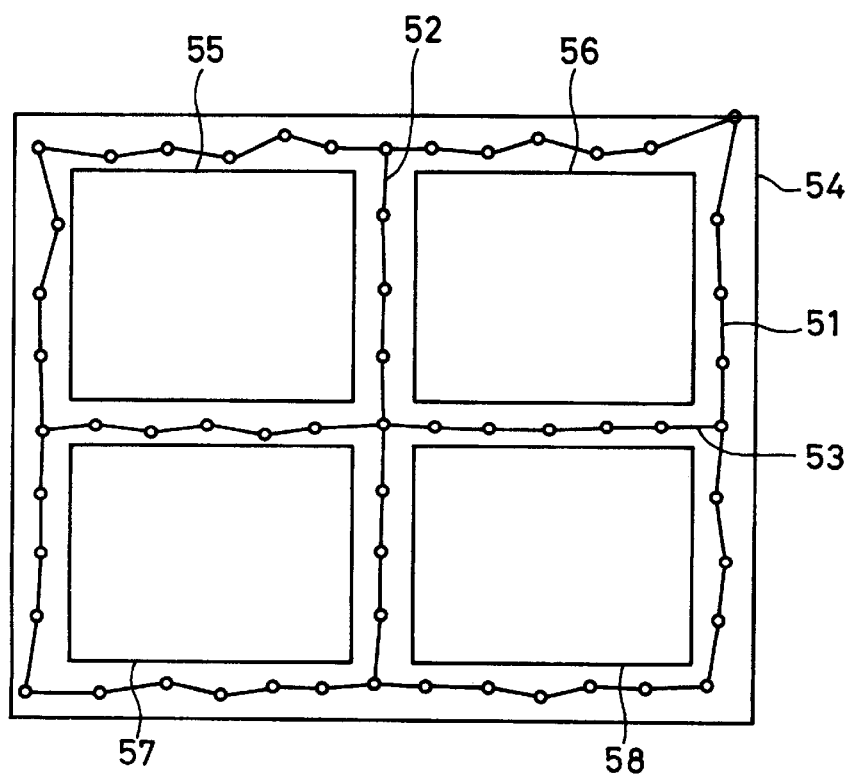
FIG. 9 is a view showing another example of measured results that are displayed.

A graphic pattern as shown in FIG. 9 is displayed on the display screen of the display monitor 7. In FIG. 9, the graphic pattern comprises display spots corresponding to the measurement spots in the outermost peripheral area 41 and along the Y-axis 42 and the X-axis 43 and measurement line segments 51, 52, 53 interconnecting the display spots. The display screen of the display monitor 7 also displays an outer rectangular frame 54 and four inner rectangular frames 55~58 which jointly define a tolerance range of arbitrary reference values.

Figure 8:
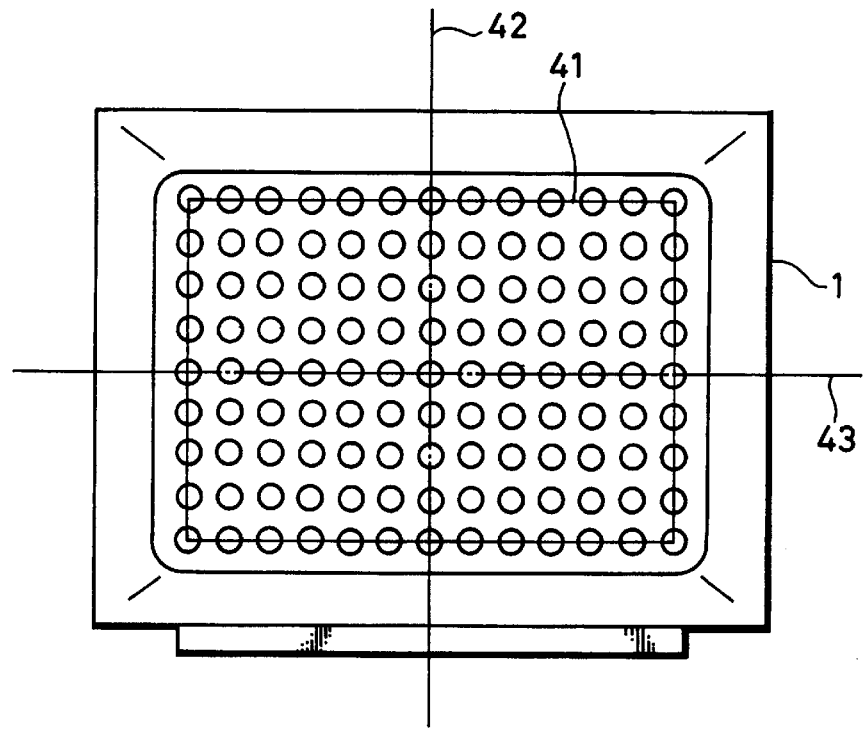
FIG. 8 is a view similar to FIG. 4, showing another example of dots displayed on the display screen for inspecting the display screen.

The image inspection system thus arranged as shown in FIGS. 8 and 9 establishes display spots corresponding respectively to measurement spots on a monitor display screen, changes the positions of the display spots depending on the differences between measured values of the measurement spots and preset reference values, and displays measured results by interconnecting the changed positions of the display spots with line segments. The measured results are thus displayed highly clearly to allow changes in the measured values to be determined accurately.

When the measurement line segments 51, 52, 53 are displayed between the rectangular frames 54~58, the measured values of the measurement spots are clearly indicated as falling within the tolerance range of reference values to permit the measured results to be judged accurately with ease.

When the measured values fall outside of the tolerance range, the measurement line segments 51, 52, 53 are displayed in different colors thereby to display the measured results more clearly. If a measured value falls within the adjustment standards, then the line segments connected to the display spot corresponding to the measured value are displayed in green. If a measured value falls between the adjustment and inspection standards, then the line segments connected to the display spot corresponding to the measured value are displayed in yellow. If a measured value falls outside of the inspection standards, then the line segments connected to the display spot corresponding to the measured value are displayed in red. In this manner, the measured results are displayed much more clearly.

With the colored line segments being thus displayed, it is possible to determine the measured results accurately even without the need for displaying the rectangular frames 54~58. If the rectangular frames 54~58 are not displayed, then the graphic pattern can be displayed at an increased speed on the display screen of the display monitor 7. The variable colors of the line segments are not limited to the hues specified above with reference to FIGS. 8 and 9, but may be such hues that are easily perceptible on the display screen of the display monitor 7 in its entirety.

The measurement of geometric raster distortions (image distortions) of the display screen of the color display unit 1 has been described above with reference to FIGS. 8 and 9 because they are easily understandable visually. However, the display monitor 7 can display similar graphic patterns for measuring color purity, convergence, focus, etc.

The image inspection system described with reference to FIGS. 8 and 9 establishes a plurality of measurement spots on a display screen to be inspected, measures images at the measurement spots, and displays measured results on a monitor display screen. The image inspection system has inspection processing means for establishing display spots corresponding to the measurement spots on the monitor display screen, changing the positions of the display spots depending on the differences between measured values of the measurement spots and preset reference values, and displaying measured results by interconnecting the changed positions of the display spots with line segments. The measured results are thus displayed highly clearly to allow changes in the measured values to be determined accurately.

In the image inspection system, the reference values are established by displaying the display spots corresponding to the measurement spots on the monitor display screen, selecting one of the measurement spots at a time, and entering reference values into the selected measurement spot. Thus, the reference values can be established with utmost ease.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An image inspection system for inspecting a display screen, comprising:

means for generating a display image of a plurality of measurement spots on a display screen to be inspected;

a monitor display screen;

means for measuring said display image at the measurement spots; and inspection processing means for generating display spots corresponding to the measurement spots on the monitor display screen, displaying measured results with interconnecting lines segments and displaying on said monitor display screen the positions of the display spots in a highlighted manner depending on the differences between measured values of the measurement spots of the display image and preset reference values.

2. An image inspection system according to claim 1, wherein said inspection processing means comprises means for displaying said line segments in a different color when said differences fall out of a predetermined tolerance range.

3. An image inspection system according to claim 2, wherein said tolerance range comprises a plurality of zones, said inspection processing means comprises means for displaying said line segments in different colors when said differences fall in said zones, respectively.

4. An image inspection system according to claim 1, further comprising:

means for establishing said preset reference values by displaying display spots corresponding to said measurement spots on said monitor display screen, selecting one of said display spots at a time, and entering reference values into said one of the display spots.

5. An image inspection system according to claim 1, wherein said inspection processing means comprises means for displaying a frame indicative of a tolerance range with respect to said display spots on said monitor display screen.

6. An image inspection system according to claim 1, wherein said images are measured at the measurement spots with respect to geometric raster distortions, color purity, convergence, or focus.

\* \* \* \* \*